US012605707B2

(12) United States Patent
Frank

(10) Patent No.: US 12,605,707 B2
(45) Date of Patent: Apr. 21, 2026

(54) METHOD FOR CONVEYING AT LEAST ONE FIRST MEDIUM WITHIN A CHANNEL SYSTEM OF A MICROFLUIDIC DEVICE

(71) Applicant: Robert Bosch GmbH, Stuttgart (DE)

(72) Inventor: Tino Frank, Lucerne (CH)

(73) Assignee: Robert Bosch GmbH, Stuttgart (DE)

( * ) Notice: Subject to any disclaimer, the term of this patent is extended or adjusted under 35 U.S.C. 154(b) by 1297 days.

(21) Appl. No.: 17/284,360

(22) PCT Filed: Oct. 8, 2019

(86) PCT No.: PCT/EP2019/077137
§ 371 (c)(1),
(2) Date: Aug. 31, 2021

(87) PCT Pub. No.: WO2020/078759
PCT Pub. Date: Apr. 23, 2020

(65) Prior Publication Data

US 2022/0062893 A1 Mar. 3, 2022

(30) Foreign Application Priority Data

Oct. 17, 2018 (DE) ..................... 10 2018 217 744.9

(51) Int. Cl.
*B01L 3/00* (2006.01)

(52) U.S. Cl.
CPC ..... *B01L 3/50273* (2013.01); *B01L 3/502738* (2013.01); *B01L 2200/0605* (2013.01); *B01L 2400/0487* (2013.01); *B01L 2400/06* (2013.01)

(58) Field of Classification Search
CPC ........... B01L 3/50273; B01L 3/502738; B01L 2200/0605; B01L 2400/0487; B01L 2400/06
See application file for complete search history.

(56) References Cited

U.S. PATENT DOCUMENTS

| | | | |
|---|---|---|---|
| 7,217,367 | B2 | 5/2007 | Huang et al. |
| 8,075,855 | B2 | 12/2011 | McAvoy et al. |

(Continued)

FOREIGN PATENT DOCUMENTS

| | | | |
|---|---|---|---|
| CN | 103672030 | A | 3/2014 |
| CN | 106255550 | A | 12/2016 |

(Continued)

OTHER PUBLICATIONS

International Search Report corresponding to PCT Application No. PCT/EP2019/077137, mailed Apr. 3, 2020 (German and English language document) (6 pages).

*Primary Examiner* — Lyle Alexander
*Assistant Examiner* — Dwan A Gerido
(74) *Attorney, Agent, or Firm* — Maginot, Moore & Beck LLP

(57) ABSTRACT

A method for conveying at least one first medium within a channel system of a fluidic device includes providing the at least one first medium at a first point in the channel system, conveying the at least one first medium from the first point to a second point of the channel system by means of at least one second medium which borders the at least one first medium, and altering at least one traversable cross-section of the channel system for a peristaltic pump function only at a time when the at least one first medium is not flowing through said at least one cross-section.

20 Claims, 11 Drawing Sheets

(56) References Cited

U.S. PATENT DOCUMENTS

| | | | |
|---|---|---|---|
| 2005/0000900 A1 | 1/2005 | Huang et al. | |
| 2007/0073273 A1 | 3/2007 | von Blumenthal et al. | |
| 2009/0288710 A1* | 11/2009 | Viovy ................ | G01N 35/1009 137/561 A |
| 2010/0041046 A1 | 2/2010 | Chiu et al. | |
| 2011/0177609 A1* | 7/2011 | Ismagilov ............ | B01J 19/0046 436/164 |
| 2017/0050187 A1 | 2/2017 | Niu | |
| 2018/0209552 A1 | 7/2018 | Gould et al. | |

FOREIGN PATENT DOCUMENTS

| | | |
|---|---|---|
| DE | 102 38 600 A1 | 3/2004 |
| WO | 98/07022 A1 | 2/1998 |
| WO | 00/28213 A1 | 5/2000 |

* cited by examiner

METHOD FOR CONVEYING AT LEAST ONE FIRST MEDIUM WITHIN A CHANNEL SYSTEM OF A MICROFLUIDIC DEVICE

This application is a 35 U.S.C. § 371 National Stage Application of PCT/EP2019/077137, filed on Oct. 8, 2019, which claims the benefit of priority to Serial No. DE 10 2018 217 744.9, filed on Oct. 17, 2018 in Germany, the disclosures of which are incorporated herein by reference in their entirety.

The invention disclosure relates to a method for conveying at least one first medium within a channel system of a microfluidic device and to a microfluidic device for carrying out a corresponding method.

BACKGROUND

Microfluidic systems permit the analysis of small sample quantities with a high degree of sensitivity. The automation, miniaturization and parallelization of the processes moreover permit a reduction in the number of manual steps and a reduction in the number of errors caused by such steps.

Miniaturization makes possible in particular loss-free processing of small sample quantities. These are to be understood as being in particular samples such as a single cell, secreted proteins or cell-free DNA (cfDNA). Since the small amount of material is transferred into the smallest possible volume, the concentration of these substances is higher than in conventional laboratory systems and the analysis of said substances is thus generally more sensitive. The processing of such a sample is conventionally realized by a cascade of fluidic steps, which should be controlled precisely. In particular peristaltic on-chip pumps permit in this context a defined movement of small volumes. Such pumps are precise and may be combined with a feedback system. However, it is in the very nature of peristaltic pumps that a small sub-volume is blocked mechanically. This generally happens in a lab-on-a-chip through deformation of the flow channel. The commonest embodiment here is pressing of a membrane against the channel wall, wherein the channel is closed. Here, the desired action for the peristaltic pump is formed but at the same time material situated in the liquid can be squeezed too. This squeezing has a detrimental effect on biological material. If a cell is directly below a pump valve when the latter is closed, several negative effects can occur for the cell. These effects are for example: (i) cell sticks to membrane and further pumping is discontinued; (ii) cell is lysed (also only partly lysed) and, as an analyte, is lost; (iii) cell is stressed and secretes corresponding cytokines (secreted neurotransmitters), which can interfere with the actual measurement; (iv) cell type is altered (for example changes into apoptotic state).

Pump valves are also not advantageous in the use of functionalized beads (for example magnetic beads with antibody) since these can be caught and destroyed as a result of the mechanical movement of the valves or impair the valve function. These effects result in such beads generally not being used in valve systems and there being a switch to filters, which increase the complexity of the microfluidic structure. Pump valves are often an integral constituent part of a microfluidic network. In particular in networks in which pumping in a circuit is realized, the analysis material must pass through the pump valves and is thus exposed to the risk of interference by or disadvantageous interaction with said pump valves.

SUMMARY

What is proposed here is a method for conveying at least one first medium within a channel system of a microfluidic device, comprising at least the following steps:

a) providing the at least one first medium at a first location of the channel system, b) conveying the at least one first medium from the first location to a second location of the channel system by means of at least one second medium, which is adjacent to the at least one first medium, c) changing at least one through-flowable cross section of the channel system for the purpose of peristaltic pumping only if this at least one cross section is not flowed through by the at least one first medium.

The solution proposed here permits in particular the provision of a dynamic, optofluidically controlled process for destruction-free pumping of biomaterials and/or functionalized particles. In particular, a description is given of a dynamic pumping process which permits peristaltic pumping of sample material with particles, such as for example cells and/or functionalized beads, without the pump mechanism having a negative influence on the sample material, in particular the particles. In particular, pumping in a circuit can be realized without any problems. Advantageously, this process can be controlled or monitored by means of an optical system.

Preferably, a fluid is subdivided into two sub-regions. Here, a first sub-region with the first medium and/or a second sub-region with the second medium can be formed. The first sub-region may also be referred to here as sample region. The second sub-region may also be referred to here as pump region. In this case, in particular, a two-phase system (oil/water) is used and/or formed. Pump valves are generally activated only if the oil phase is situated at said pump valves, water phase (incl. sample) not being pumped there.

The at least one first medium comprises in particular particles, biological material and/or at least one functionalized substance. For example, the first medium may be formed with a liquid in which (undissolved) particles, biological material and/or at least one functionalized substance are/is contained. The liquid of the first medium is in particular a water-based liquid, preferably water or an aqueous solution. The particles or the biological material may for example be biological cells, cell-free DNA, circulating cancer cells, secreted cytokines and/or lysate of a few cells. The functionalized substance may for example involve a so-called (functionalized) bead. In particular, particles to be examined or biological material to be examined are/is involved here. The first medium may (consequently) contain or be a sample to be examined, for example.

The term "microfluidic" generally relates here to the scale of the microfluidic device. The microfluidic device is characterized in particular in that physical phenomena generally associated with microtechnology are relevant in the fluidic channels and chambers arranged therein. Said physical phenomena include for example capillary effects, and effects (in particular mechanical effects) which are related to surface tensions of the fluid. They also additionally include effects such as thermophoresis and electrophoresis. In microfluidics, these phenomena are normally dominant over effects such as gravity. The microfluidic device may also be characterized in that it is produced at least partially using a layer-by-layer method and channels are arranged between layers of the layer structure. The term "microfluidic" may also be characterized via the cross sections within the device that serve for guidance of the fluid. For example, cross sections in the range from 100 μm (micrometers) by 100 μm up to 800 μm by 800 μm are normal. Significantly smaller cross sections, for example in the range from 1 μm to 20 μm (micrometers), in particular in the range from 3 μm to 10 μm, are also possible.

The channel system may comprise one or more channels. Preferably, at least in a circular region of the channel system, the channel system comprises four channels which are connected to one another to form a rectangle and which are through-flowable one after the other, in particular repeatedly. The channels are generally microfluidic channels. The channel system may furthermore comprise or at least be connected to one or more chambers. Corresponding chambers may for example be sample intake chambers, analysis chambers, storage chambers and/or observation chambers.

In step a), the at least one first medium is provided at a first location of the channel system. The first location may be situated for example in a connection region in which a sample intake chamber is or can be connected to at least one further channel of the channel system. The provision may in particular comprise the first medium being present at the first location and/or extending up to the first location. In the region of the first location, provision may be made for example of a valve which, for example, can influence the time at which, and the duration over which, the first medium can pass through the first location.

"Providing" is to be understood here in particular as meaning that the at least one first medium is brought to the first location of the microfluidic device, for example through introduction of the at least one first medium into the microfluidic device through an opening. However, "providing" also comprises for example that the microfluidic device already contained at least one first medium prior to the beginning of the method described. In this regard, for example, a microfluidic device in which the at least one first medium is already pre-stored in a chamber can be acquired from a supplier. It is also possible for the at least one first medium, in step a), to be obtained through combined feeding of multiple substances and provided in this respect. In this regard, for example, a solvent may be pre-stored in the microfluidic device. Feeding of a sample into the microfluidic device allows the sample to be mixed with the solvent. The solution of the sample in the solvent may be the first medium.

In step b), the at least one first medium is conveyed from the first location to a second location of the channel system by means of at least one second medium, which is adjacent to the at least one first medium. Generally, the at least one first medium and the at least one second medium cannot be mixed with one another.

In other words, in step b), transportation of the first medium through the microfluidic device is in particular realized. Here, the at least one first medium can be protected particularly effectively. For this purpose in particular, the at least one first medium is preferably bordered by the at least one second medium in such a way that the at least one first medium is adjacent only to the at least one second medium and, optionally, additionally to fluid delimitations of the microfluidic device.

Each wall of the microfluidic device that delimits for example a channel or a chamber of the microfluidic device comes into consideration in particular as a fluid delimitation here. Media such as the at least one first medium and the at least one second medium may be present and moved in particular within the fluid delimitations within the microfluidic device. The fluid delimitations may have at the the fluid to be delimited in particular a material such as glass and/or plastic.

The at least one first medium can, in step b), be protected in particular from coming into contact with other substances. This can be achieved for example in that the at least one first medium, where not in contact with a fluid delimitation, is in contact only with the at least one second medium. The fact that the at least one first medium and the at least one second medium generally cannot be mixed with one another means that the at least one first medium can be transported without change through contact with the second medium. The at least one second medium may be regarded in particular as an aid for transportation of the at least one first medium. After transportation, the at least one first medium and the at least one second medium can be separated from one another.

The at least one second medium is preferably an oil. It is also preferred that the at least one second medium is an organic substance. It is preferred in particular that the at least one first medium is polar and the at least one second medium is non-polar. This is the case for example if water is the first medium and oil is the second medium. Water mixed with classical attributes such as Tween, Triton-X, BSA and/or calcium may be used as aqueous solution for the first medium. Inert mineral oils, silicone oils and/or fluorinated oils may be used in particular as possible second media. Preferably, the use of surfactants is dispensed with.

The method described in particular allows a defined volume of an aqueous phase (as the at least one first medium) to be confined, and moved in a controlled manner, in an oil phase (as the at least one second medium). For example, here, an analyte situated in the aqueous phase can be present in a limited small quantity and be processed in a loss-free and dilution-free manner in the microfluidic device.

The use of the at least one second medium (in particular an organic phase) allows the at least one first medium (in particular an aqueous volume) to be confined in such a manner that, for example, a limited analyte in the at least one first medium is not diluted by way of deposition or diffusion. Consequently, loss-free transportation of limited sample materials (as first medium) is in particular possible. In this regard, for example, a lysate composed of a few cells that is produced locally in a microfluidically small volume can be transported from an intake chamber to another position in the microfluidic device so as to be processed biochemically. The loss-free transportation of limited material such as DNA, proteins and/or individual cells can make possible a design of a microfluidic processing unit in which, for example, a heater or optical units is/are provided at a position other than a sample intake position. This can allow a particularly universal design of the microfluidic device.

Preferably, the volume or the quantity of the second medium in the device and/or in the channel system is constant. This is also referred to here, by way of example, as conservation of the pump region. For example, a compensation container or a chamber may be provided in the channel system and/or connected to the latter, which compensation container or chamber makes it possible for the volume or the quantity of the second medium in the device and/or in the channel system to be kept constant. It is furthermore preferable for preferably defined sub-volumes or sub-quantities of the second medium to be conveyed or circulated in a circuit in the device and/or in the channel system.

It is furthermore preferable for a total volume provided at the first location, or a total quantity, of the first medium, for transportation to the second location, to be subdivided into multiple (smaller), in particular defined sub-volumes or sub-quantities of the first medium. Particularly preferably, the subdivision is realized through use of the preferably defined sub-volumes or sub-quantities of the second medium and/or of a predetermined valve actuation, in particular in a circular region of the channel system. Particularly preferably, the total volume or the total quantity of the first medium is brought together again (as far as possible without losses) at the second location, in particular in that the individual sub-volumes or sub-quantities of the first medium are combined (successively) to form the total volume or the total quantity of the first medium. Here, there should be as little as possible or even as far as possible no first medium present between the sub-volumes or sub-quantities of the first medium that are combined at the second location.

This can advantageously be made possible in that the sub-volumes of the second medium are conveyed in a circuit (in a loss-free manner) in a circular region of the device and/or of the channel system and, at one point of the circuit (the first location), a sub-volume of the first medium is in each case arranged between two sub-volumes of the second medium (in particular sucked into the circuit) and, at a further point of the circuit (the second location), the sub-volumes of the first medium are released again (in particular ejected from the circuit). Here, the circuit need not describe the shape of a geometrical circle.

In step c), at least one through-flowable cross section of the channel system is changed for the purpose of peristaltic pumping only if this at least one cross section is not flowed through by the at least one first medium. In particular, at least one through-flowable cross section of the channel system is changed for the purpose of peristaltic pumping only if this at least one cross section is flowed through by the at least one second medium and/or a third medium.

The at least one through-flowable cross section of the channel system is changed, in particular reduced and/or enlarged, in particular through actuation of at least one valve. Here, the at least one valve is generally arranged at least partially in the channel system. For the purpose of peristaltic pumping, it is particularly advantageous if at least two or even at least three through-flowable cross sections of the channel system that are (directly) adjacent to one another are changed. In this respect, for example, at least two or even at least three valves which are (directly) adjacent to one another can be actuated, in particular in or with a pump mode, for the purpose of effecting peristaltic pumping of fluid through the channel system.

According to an advantageous configuration, it is proposed that the change in the at least one through-flowable cross section of the channel system for the purpose of peristaltic pumping is carried out with at least one valve. This means in other words in particular that the peristaltic action is achieved with valves. In this context, it is preferable if three valves (interacting with one another) form a peristaltic pump.

"Peristaltic pumping" is to be understood here as meaning a pump which conveys a liquid with the aid of peristaltic action. A typical peristaltic pump is a hose pump, also referred to as a hose squeeze pump. Peristaltic pumps are positive displacement pumps in which the medium to be conveyed is forced through a channel by way of an external mechanical deformation. Microfluidic peristaltic pumps can be constructed from a plurality of valves. Commonly used microfluidic valves comprise a channel which can be closed off through a movement of the channel wall as a result of an electrical force or a magnetic force. Such valves generate an (internal) change in volume of the channel. If such valves are arranged in a series connection along a channel, it can be achieved through suitable actuation of the valves that peristaltic action of the channel, which effects conveyance of the liquid, occurs. The opening and closing of the valves result in the occurrence of changes in volume of a channel that cause a medium to be transported through the channel of the microfluidic device. A peristaltic pump has the advantage that, for this, no (other) pumping elements are required beside the valves (for example mechanically or electrically operating pump chambers). It is sufficient that the plurality of valves is provided.

For peristaltic pumping, it is preferable for there to exist the possibility of (automatic) valve switching, according to which the valves are actuated in an automated manner in a sequence suitable for conveyance. One possibility for such an actuation is described here using the example of three valves situated (directly) next to one another, which form a peristaltic pump by way of serial opening and closing. Here, for the purpose of showing the respective valve status, a digital representation is used, in that for example a "1" stands for "open" and a "0" stands for "closed". The valve status sequence 100, 110, 010, 011, 001, 101 generally generates a movement from left to right. The sequence 001, 011, 010, 110, 100, 101 generally generates a movement from right to left.

According to a further advantageous configuration, it is proposed that valves arranged in the channel system, for the purpose of peristaltic pumping, do not act on the first medium. Preferably, the valves act only on the second medium. It is furthermore preferable for the valves to act only on the second medium or a third medium. In particular, an actuation of a valve is stopped if a volume of the first medium is moving toward the valve and is (just) before the valve and/or if a volume of the first medium is situated within the through-flowable cross section of the valve.

According to a further advantageous configuration, it is proposed that the at least one first medium is sucked into a circular region of the channel system in that at least one part of the at least one second medium flows away from the first location of the channel system. Preferably, in this case, the route to the first location within the circular region is blocked. It is furthermore preferable for second medium situated downstream of the first location within the circular region to be conveyed to a chamber for the second medium, so that the volume of the second medium within the circular region that is situated downstream of the first location is reduced and the first medium is consequently sucked into the circular region or a channel of the channel system that (co-)forms the circular region. In other words, the first location may also constitute an inflow or inlet for the first medium into the circular region.

According to a further advantageous configuration, it is proposed that at least one part of the at least one second medium circulates in a (the) circular region of the channel system. Preferably, in particular (pre-) defined sub-volumes of the second medium circulate through the circular region. Here, it may also be provided that the sub-volumes are conveyed repeatedly into a chamber for the second medium that is connected to the circular region and out of said chamber again (back into the circular region). Particularly preferably, the total volume of the second medium in the device is or remains (substantially) constant.

A circular course or conveyance "in a circuit" may in other words also be described here such that the configuration of the channel system in this region should be suitable for allowing (possibly also in dependence on valve positions) a defined volume of the medium or fluid and/or a defined region (moving along with the flow) of the medium flow or fluid flow to repeatedly pass through the same location during uninterrupted flow.

According to a further advantageous configuration, it is proposed that a sub-region of a (the) circular region of the channel system is not flowed through by the at least one first medium during regular operation of the device. Preferably, that sub-region in which valves are situated is not flowed through by the at least one first medium. Preferably, the sub-region is flowed through only by the second medium and/or a third medium. It is furthermore preferable for second medium and/or a third medium to be situated at all times in the sub-region during regular operation. “Regular” operation is to be understood here as meaning in particular an operation of the device without failure of valves.

In this respect, it is furthermore preferred that at least the first location or the second location is respectively situated downstream or upstream of the sub-region. Preferably, the first location is situated immediately downstream of the sub-region. This means in other words in particular that the sub-region ends immediately before the first location (in the regular flow direction through the circular region) and/or at the first location. It is furthermore preferable for the second location to be situated immediately upstream of the sub-region. This means in other words in particular that the sub-region ends immediately after the second location (in the regular flow direction through the circular region) and/or at the second location.

According to a further advantageous configuration, it is proposed that the at least one first medium is discharged from a circular region of the channel system in that at least one part of the at least one second medium flows to the second location of the channel system. Preferably, in this case, the route downstream of the second location or away from the second location within the circular region is blocked when the first medium arrives at the second location. This advantageously contributes to the first medium having to exit the circular region toward the second location and not being able to flow further in the circular region (in particular into the above-described sub-region). Here, the second medium generally pushes the first medium ahead of itself and out of the circular region. The second location may in other words also constitute an outflow or outlet for the first medium from the circular region.

According to a further advantageous configuration, it is proposed that the conveyance of the at least one first medium is monitored optically. Preferably, the conveyance of the at least one first medium is monitored optically in a mechanical manner. Particularly preferably, the optical monitoring is realized by means of at least one optical sensor, such as for example a camera.

According to a further advantageous configuration, it is proposed that the conveyance of the at least one first medium is monitored via a degree of filling of a chamber connected to the channel system. Preferably, the degree of filling is captured or detected optically, for example by a camera which is directed toward the chamber (having an at least sectionally transparent or translucent chamber wall).

According to a further advantageous configuration, it is proposed that the conveyance of the at least one first medium is monitored via at least one third medium, which is adjacent to the at least one second medium. Generally, the third medium cannot be mixed with the first medium and/or the second medium. Preferably, an in particular (pre-)defined volume of the third medium is separated and/or spaced apart from the first medium, in particular separated and/or spaced apart from a (pre-)defined volume of the first medium, by an in particular (pre-)defined volume of the second medium. Preferably, the third medium is a dye. The color of the dye generally differs from the color of the second medium and/or of the first medium. Dextrans, preferably with a fluorescent dye marking, are particularly suitable as dyes. Alternatively or cumulatively, (pure) fluorophores may be used for example as dyes.

The third medium may, for example, be pre-stored in a storage chamber. Furthermore, the channel system may be configured in such a way that the third medium exits the storage chamber toward an observation chamber when first medium flows into an analysis chamber. In this case, it is particularly preferable for the volume of the third medium flowing into the observation chamber to be proportional to the volume of the first medium flowing into the analysis chamber. This advantageously makes it possible to easily deduce the degree of filling of the analysis chamber if (only) the degree of filling of the observation chamber can be monitored.

Particularly preferably, the conveyance of the at least one first medium is monitored via an optically detected degree of filling of a third medium, adjacent to the at least one second medium, in a chamber connected to the channel system. This is particularly advantageous if an analysis chamber or a degree of filling of the first medium in a chamber cannot be (directly) detected optically. This means in other words in particular that this can contribute to an indirect detection of the degree of filling of the first medium in a chamber.

According to a further aspect, a microfluidic device configured for carrying out a method proposed here is also proposed. In particular, valves of the microfluidic device are arranged and/or actuated in such a way that these are not flowed through by the first medium and/or do not disturb the flow of the first medium through these valves. Preferably, at least some of the valves are arranged in such a way that are not flowed through by first medium. Furthermore, it is preferable if at least some of the valves are actuated in such a way that they do not disturb the flow of the first medium through these valves.

The microfluidic device may in particular be a so-called “lab on a chip” or a “point-of-care” system (PoC). Such a “lab on a chip” is intended and configured for carrying out biochemical processes. This means that functionalities of a macroscopic laboratory are integrated, for example into a plastic substrate. The microfluidic device may have for example channels, reaction chambers, pre-stored reagents, valves, pumps and/or actuation, detection and control units. The microfluidic device can allow biochemical processes to be processed fully automatically. Consequently, for example, tests on liquid samples can be carried out. Such tests can be used for example in medicine. The microfluidic device may also be referred to as a microfluidic cartridge. Biochemical processes can be carried out in the microfluidic device in particular through feeding of samples into the microfluidic device. Here, additional substances which trigger, speed up and/or make possible biochemical reactions can also be admixed with the samples.

The details, features and advantageous configurations discussed in connection with the method may also arise correspondingly in the case of the device presented here, and vice versa. To this extent, for more detailed characterization of the features, reference is made in full to the statements made there.

BRIEF DESCRIPTION OF THE DRAWINGS

The solution presented here and its technical context will be explained in more detail below on the basis of the figures.

It is pointed out that the disclosure is not intended to be restricted by the exemplary embodiments shown. In particular, unless explicitly stated otherwise, it is also possible to extract partial aspects of the substantive matter explained in the figures and to combine them with other constituent parts and/or findings from other figures and/or from the present description. In the figures, schematically.

DETAILED DESCRIPTION

Figure 1:
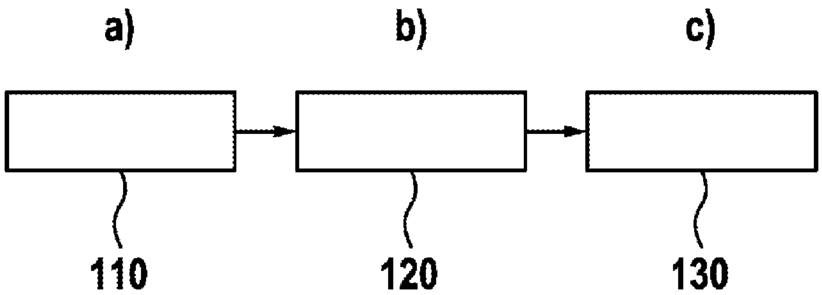
FIG. 1 shows an exemplary sequence of a method proposed here.

FIG. 1 schematically shows an exemplary sequence of a method proposed here. The method serves for conveying at least one first medium 1 within a channel system 2 of a microfluidic device 3. The order of the steps a), b) and c), which is illustrated by the blocks 110, 120 and 130, is generally realized in the case of a regular operating sequence. Furthermore, the steps a), b) and c) may also be carried out, at least in part, in parallel or even simultaneously. In block 110, the at least one first medium 1 is provided at a first location 6 of the channel system 2, which first location is indicated for example in FIG. 5*b*) and which generally forms a connection point, a connection or a mouth into the channel system 2. In block 120, the at least one first medium 1 is conveyed from the first location 6 to a second location 7 of the channel system 2 by means of at least one second medium 4, which is adjacent to the at least one first medium 1. In block 130, at least one through-flowable cross section of the channel system 2 is changed for the purpose of peristaltic pumping only if this at least one cross section is not flowed through by the at least one first medium 1.

Figure 2:
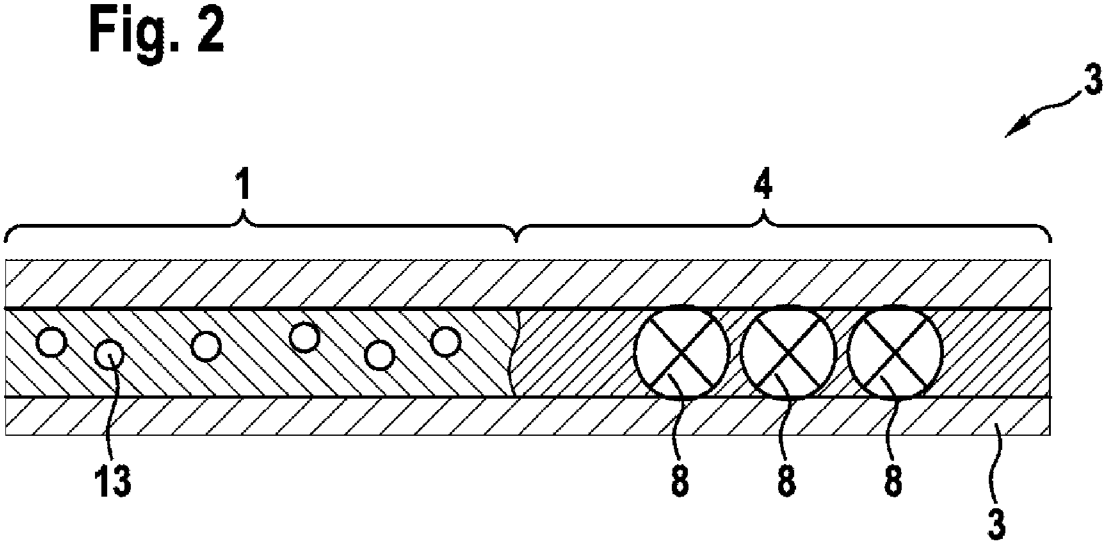
FIG. 2 shows an exemplary mode of operation of a microfluidic device proposed here.

FIG. 2 schematically shows an exemplary mode of operation of a microfluidic device 3 proposed here. The reference signs are used consistently, and so reference may be made in full to the statements concerning the preceding figure.

FIG. 2 illustrates by way of example a basic principle of the solution presented here. The fluid to be pumped, which comprises the first medium 1 and the second medium 4, is in this case a two-phase system. The fluid to be pumped is subdivided here into two regions (corresponding to the phases), specifically a sample region formed with the first medium 1 and a pump region formed with the second medium 4. This means in other words in particular that the section of the fluid and/or of the extent of the fluid through the channel system 2 in which the first medium 1 is situated are/is referred to as sample region and that/those in which the second medium 4 is situated are/is referred to as pump region.

The sample region or the first medium 1, in which the analyte, in the form of particles 13 in this case by way of example, is situated and which is often only a small volume, is that part of the fluid on which no pump valves are to act. If the sample region or the first medium 1 is situated in the vicinity of or directly below a valve 8, the latter is not actuated or remains in its position at the present moment or is (fully) opened (that is to say transferred into a (fully) open valve position) as quickly as possible, in order that as far as possible no damage to the sample, to the particles 13 in this case, due to valves 8 occurs. The remaining part of the fluid is the pump region or the second medium 4. Here, this is for example an organic phase (preferably an inert oil) which may be acted on by valves 8 and may be used for pumping. The sample region or the region of the first medium 1 does not necessarily have to be connected, but rather may also be separated by multiple pump regions or regions with second medium 4.

The valve positions of the valves 8 are indicated (consistently) in the figures as follows: A cross or "X" stands for a (fully) closed valve, that is to say a valve which is in a (fully) closed valve position. A circle or "0" stands for a (fully) open valve, that is to say a valve which is in a (fully) open valve position. A circle or "0" with an arrow or only an arrow stands for a pumping valve, that is to say a valve which is in a pump mode. Here, interaction of at least three (directly) adjacent valves 8 is generally provided, or particularly advantageous, for pumping.

FIG. 3 schematically shows a further exemplary mode of operation of a microfluidic device 3 proposed here. The reference signs are used consistently, and so reference may be made in full to the statements concerning the preceding figures.

FIG. 3 illustrates by way of example that the change in the at least one through-flowable cross section of the channel system 2 for the purpose of peristaltic pumping is carried out with at least one valve 8. In this case, by way of example, three (directly) adjacent valves 8 together form in each case one peristaltic pump. According to the illustration in FIG. 3, all the valves 8 are in a pump mode. Furthermore, FIG. 2, for example, illustrates that valves 8 arranged in the channel system 2, for the purpose of peristaltic pumping, do not act on the first medium 1. It can be seen that the valves 8 in the pump mode act only on the second medium 4.

Figure 3A:
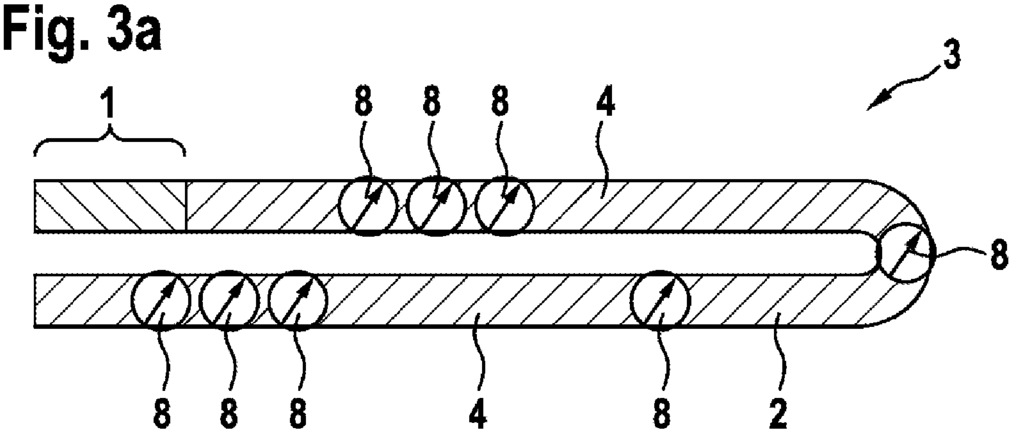
FIG. 3 shows a further exemplary mode of operation of a microfluidic device proposed here.
Figure 3B:
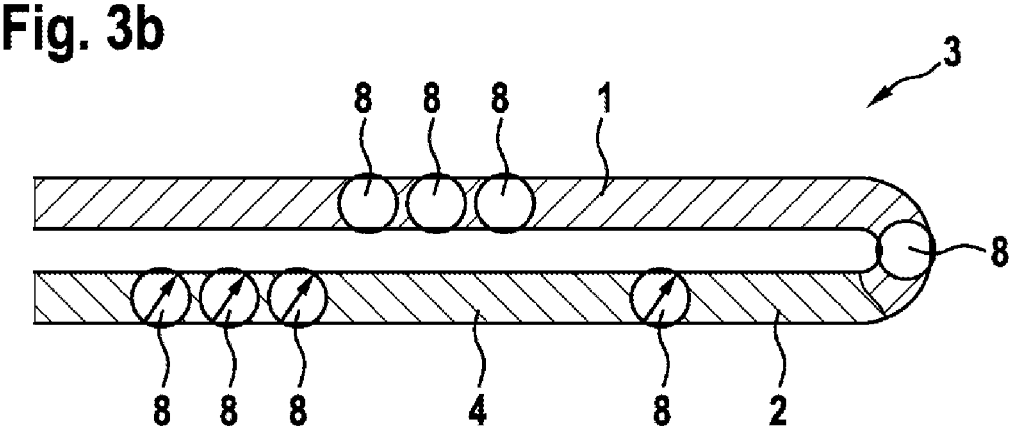
Figure 3C:
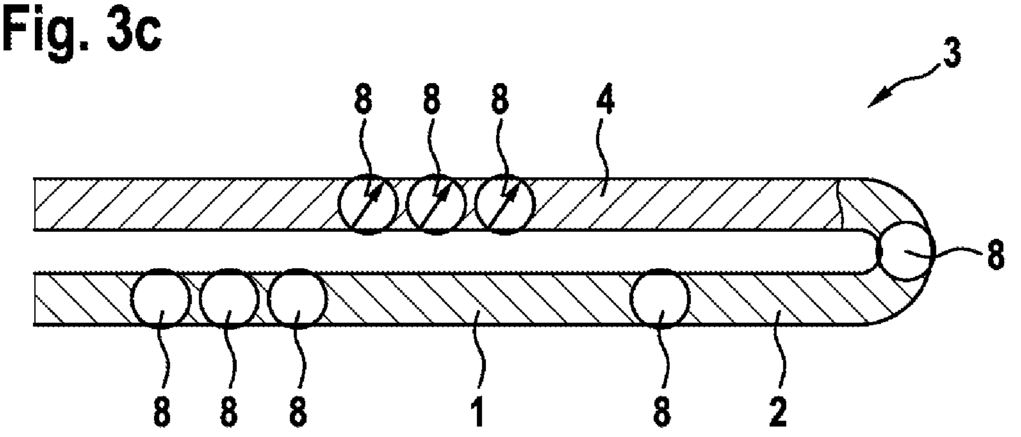

FIG. 3 describes in this respect a possible pumping sequence in a channel 2 with the fluid system illustrated by way of example in FIG. 2. This shows a channel 2 with eight valves 8 which may be used for peristaltic pumping. At least three pump valves are used for one pump. If the sample region or the first medium 1 then approaches the first valve group, that is to say the upper three (directly) adjacent valves 8 (cf. FIG. 3*a*), these are deactivated (see FIG. 3*b*). If the pump region or the second medium 4 flows again at these valves 8, they are reactivated or transferred into a pump mode (see FIG. 3*c*). Due to the position and corresponding composition of the two regions or media 1, 4, there are always enough valves 8 available for pumping without the sample region or the first medium 1 having to be destroyed by pump valves.

Figure 4A:
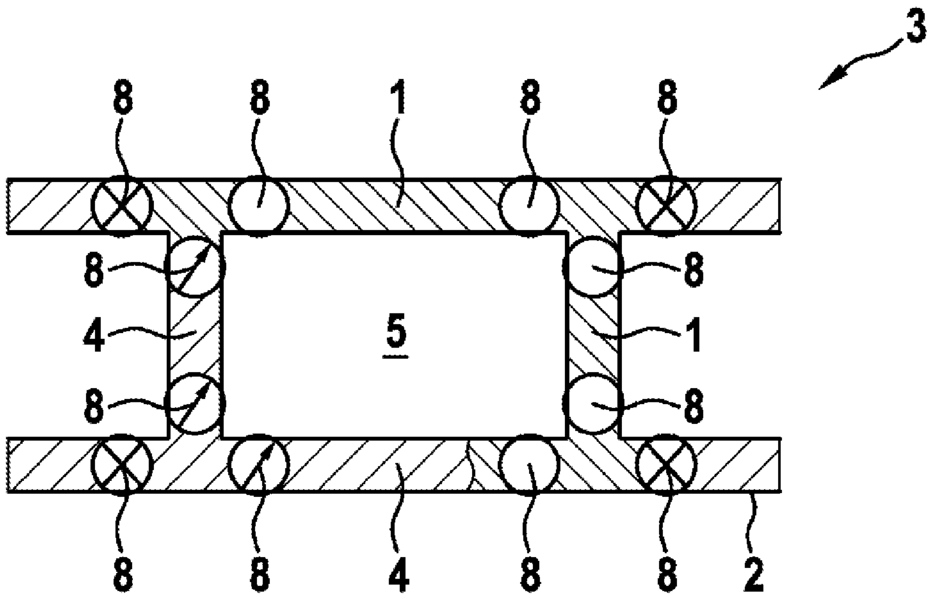
FIG. 4 shows a further exemplary mode of operation of a microfluidic device proposed here.
Figure 4B:
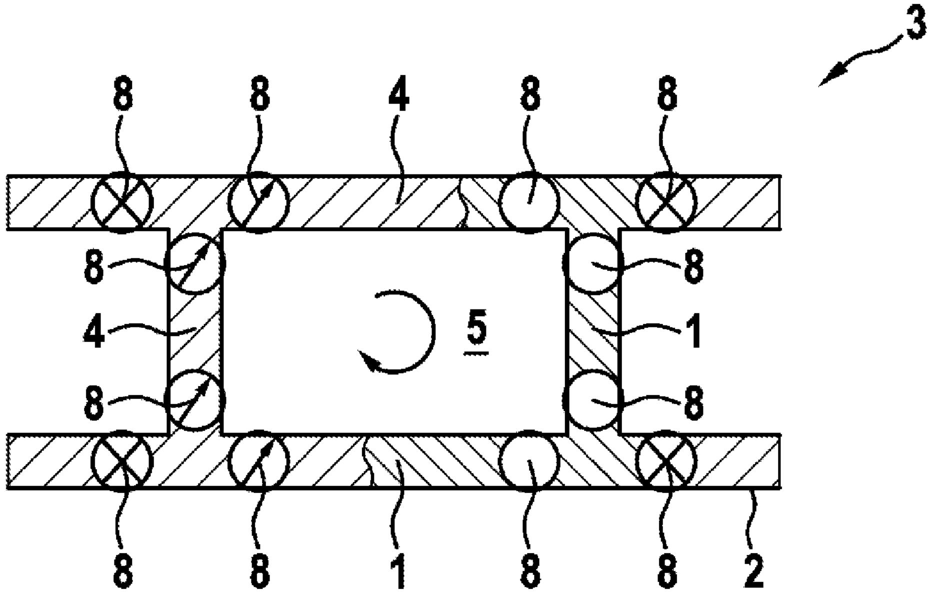

FIG. 4 schematically shows a further exemplary mode of operation of a microfluidic device 3 proposed here. The reference signs are used consistently, and so reference may be made in full to the statements concerning the preceding figures.

According to the illustration in FIG. 4, it is shown that the channel system 2 has a circular region 5. Channels of the channel system 2 run in a circular manner in the circular region 5 and thereby permit (according to valve position) conveyance of medium or fluid in a circuit, in other words circulation of medium or fluid through the channels which form the circular region 5 of the channel system 2. However, a circular course or conveyance "in a circuit" does not, in relation to the solution proposed here, necessarily require a geometrical circular shape or a curved course of channels. Rather, the channels may also be arranged in the manner of a rectangle, as is also illustrated for example in FIG. 4. A circular course or conveyance "in a circuit" may in other words consequently also be described here such that the configuration of the channel system 2 in this region should be suitable for allowing (possibly also in dependence on valve positions) a defined volume of the medium or fluid and/or a defined region (moving along with the flow) of the medium flow or fluid flow to repeatedly pass through the same location during uninterrupted flow.

In this respect, FIG. 4 illustrates a succession of pumps in a circular network of channels 5. Here, too, valves 8 pump only if the pump region or the second medium 4 is situated at the valves 8. As already mentioned, the sample region may also be divided into multiple sample regions, separated by pump regions.

FIG. 5 schematically shows a further exemplary mode of operation of a microfluidic device 3 proposed here. The reference signs are used consistently, and so reference may be made in full to the statements concerning the preceding figures.

FIG. 5 illustrates a further example of a channel system 2 with a circular region 5. It can be seen that (according to the position of the valves 8) at least one part of the at least one second medium 4 can circulate or be circulated in the circular region 5 of the channel system 2.

Figure 5A:
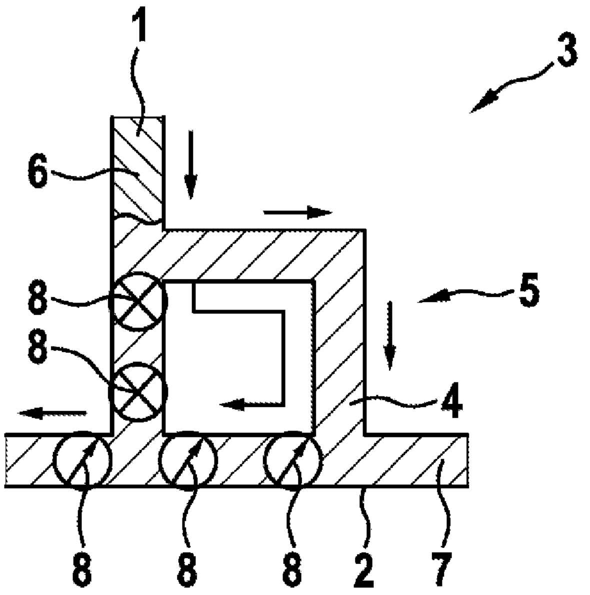
FIG. 5 shows a further exemplary mode of operation of a microfluidic device proposed here.

FIG. 5*a* illustrates by way of example that the at least one first medium 1 can be sucked into a circular region 5 of the channel system 2 in that at least one part of the at least one second medium 4 flows away from the first location 6 of the channel system 2. In particular in connection with FIG. 5*b*, it is moreover illustrated for example that a (and by way of example which) sub-region 9 of the circular region 5 of the channel system 2 is not to be flowed through by the at least one first medium 1 during the regular operation of the device 3. In this respect, it can also be seen that, here, by way of example, the first location 6 and the second location 7 are respectively situated downstream and upstream of the sub-region 9.

Figure 5B:
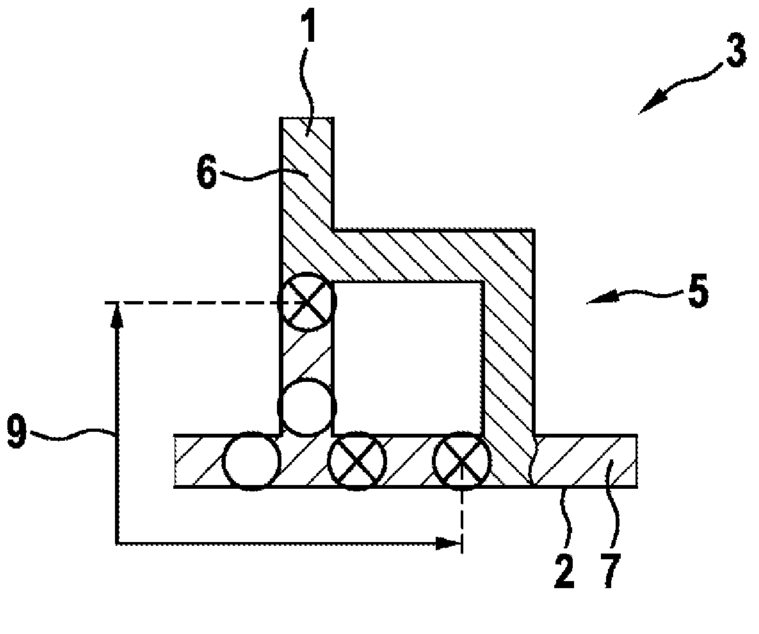
Figure 5C:
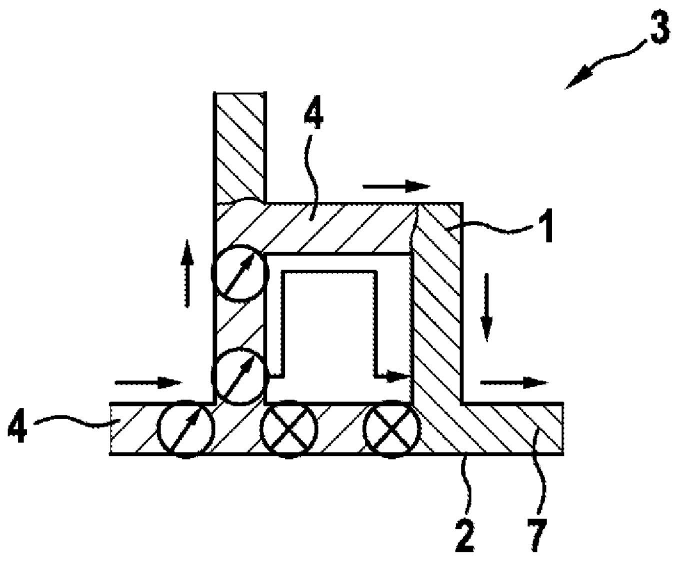

On the basis of FIG. 5*c*, it is illustrated for example that the at least one first medium 1 can be discharged from the circular region 5 of the channel system 2 in that at least one part of the at least one second medium 4 flows to the second location 7 of the channel system 2. In the process, the second medium 4 pushes the first medium 1 ahead of itself according to the illustration in FIG. 5*c*.

FIG. 5 illustrates in particular an embodiment variant of the solution presented here in which a controlled, automatic region division can be realized and the sample solution or the medium 1 can be transported in a problem-free and loss-free manner. For this purpose, the the device has a circular unit, in particular the channel system 2 has a circular region 5, which can be installed in principle in any desired manner between a sample intake chamber and a destination chamber of the sample, such as for example an analysis chamber.

FIG. 5*a* illustrates a first step, in which the sample material or the first medium 1 is drawn to the circular unit or the circular region 5 of the channel system 2. In this case, pumping is performed from a sample intake (not illustrated in more detail here), which is situated upstream of the first location 6, to an oil reservoir (not illustrated in more detail here), which is connected to that end of the channel system 2 which is illustrated bottom left in FIG. 5. The oil reservoir may be formed for example with a chamber (not illustrated in more detail here) (cf. FIG. 6, chamber 10), in which second medium 4 can be kept available. Thus, here, the second medium 4 is by way of example oil. In other words, the second medium 4 forms an oil phase, by means of which the first medium 1 can be conveyed.

If the sample is in the circular region 5, in a further (second) step, which is illustrated in FIG. 5*b*, the pumping operation is stopped and, subsequently, in a further (third) step, the pump setup, as illustrated in FIG. 5*c*, is changed such that pumping is performed from the oil reservoir to a sample determination chamber (not illustrated in more detail here). The sample determination chamber is connected to the circular region 5 at the second location 7.

Figure 5D:
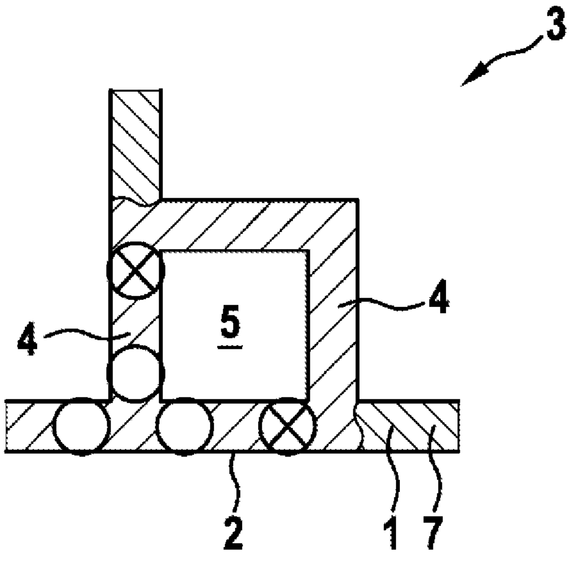
Figure 5E:
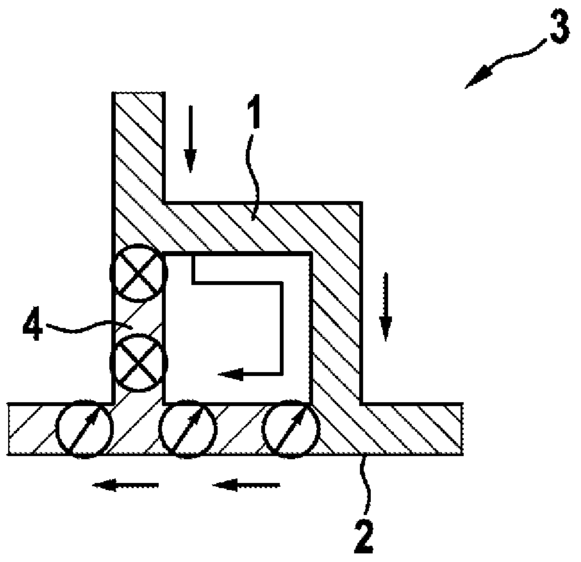
Figure 5F:
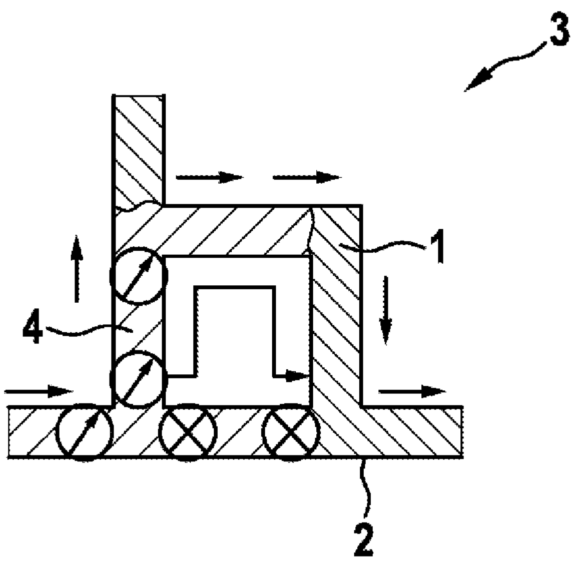

If the pump region (oil phase) or the second medium 4 reaches the bottom right edge of the pump region or of the circular region 5, as is shown in FIG. 5*d*, the pumps are stopped (again). FIG. 5*e* illustrates that pumping is then performed again with the first step (according to FIG. 1), and the setup according to the second step or FIG. 5*b* has been reached again, and, according to FIG. 5*f*, the setup from the third step or FIG. 5*c* can be applied again. This can be repeated until the entire sample region or the entire first medium has passed through the circular unit or the circular region 5.

The pump valves are situated here in particular in the left-hand and bottom channels of the cyclical system (according to the illustration in FIG. 5). These, here, are filled permanently with oil or second medium 4 and consist in particular only of pumping phase. Backflow of sample material or first medium 1 into this region should be avoided.

Corresponding closure of valves (not illustrated in more detail here) in the feed channel (upstream of the first location 6) and withdrawal channel (downstream of the second location 7) can also contribute to this. These valves can be closed in particular due to the expectation that the sample is situated in a restricted volume of the first medium 1 and is confined between two oil phases or two sections with second medium 4.

The number of the required pumping steps can be controlled for example by the fixed geometry of the channels. Moreover, the pump region or the second medium 4, in the example in FIG. 5, is conserved and moves back and forth between two end positions during the pumping operation.

FIG. 6 schematically shows a further exemplary mode of operation of a microfluidic device 3 proposed here. The reference signs are used consistently, and so reference may be made in full to the statements concerning the preceding figures.

FIG. 6 illustrates by way of example that the conveyance of the at least one first medium 1 can be monitored optically. It is furthermore shown here that the conveyance of the at least one first medium 1 can be monitored via a degree of filling 12 of a chamber 10 connected to the channel system 2. FIG. 6 moreover shows by way of example that the conveyance of the at least one first medium 1 can be monitored via at least one third medium 11, which is adjacent to the at least one second medium 4.

With the exemplary mode of operation in FIG. 6, the conveyance of the at least one first medium 1 is monitored in particular via an optically detected degree of filling 12 of a third medium 11, adjacent to the at least one second medium 4, in a chamber 10 connected to the channel system 2. For optical detection, use may be made for example of an optical sensor, such as for example a camera.

In this respect, FIG. 6 shows in an embodiment variant how the embodiment variant according to FIG. 5 can be controlled or monitored optofluidically by way of example. To this extent, this is a particularly advantageous aspect of the process described here since different viscosities of samples, cartridge variation or device variation can lead to pumping-cycle variation. Consequently, this embodiment variant in FIG. 6 provides an exemplary basis for an optical control, in particular for the system from FIG. 5.

Here, conservation of the pump region or a substantially constant volume of second medium 4 is used and, for example, the bottom left access channel is coupled to a chamber 10 which can be read optically. Said chamber 10 is, in an end state, half-filled with a dye, for example (cf. FIG. 6*a*). Here, the dye constitutes an example of a third medium 11. The remainder of the chamber is filled with oil, which, here, constitutes an example of the second medium 4.

If the pumping phase or the second medium 4 is then moved, then the dye or the third medium 11 is moved along therewith too. If, in the access channel to the chamber 10 with the dye, even more dye is pre-stored, then the chamber 10 is slowly filled with all the dye (cf. FIG. 6*b*). The volume of said dye is generally calculated, and filled, in advance such that, in the second end state, the chamber 10 is filled completely (see FIG. 6*c*). If the pump is then reversed again, then the dye moves back again (see FIG. 6*d*) and the filling of the first end state is assumed again.

Figure 6A:
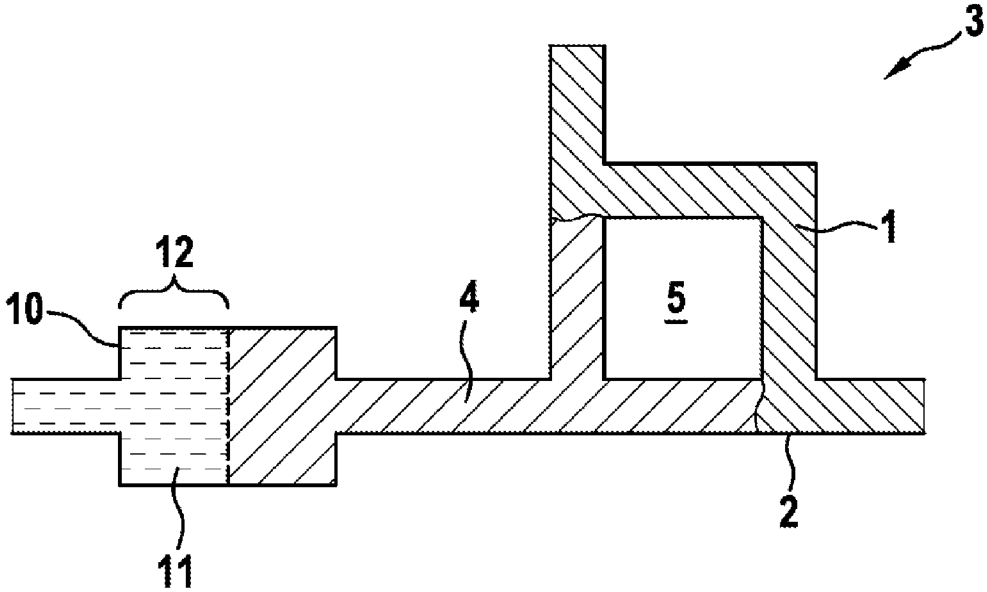
FIG. 6 shows a further exemplary mode of operation of a microfluidic device proposed here.
Figure 6B:
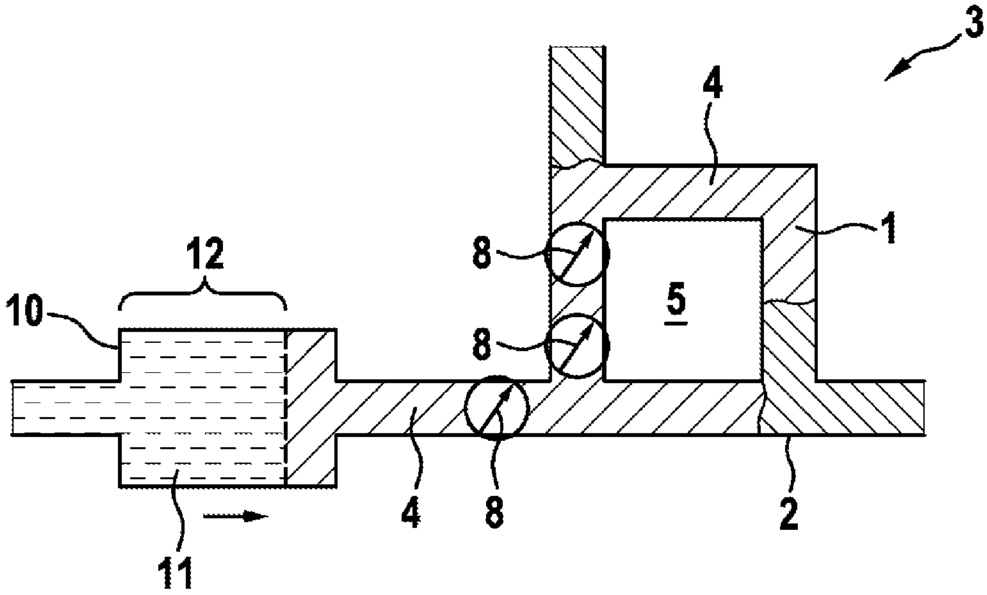
Figure 6C:
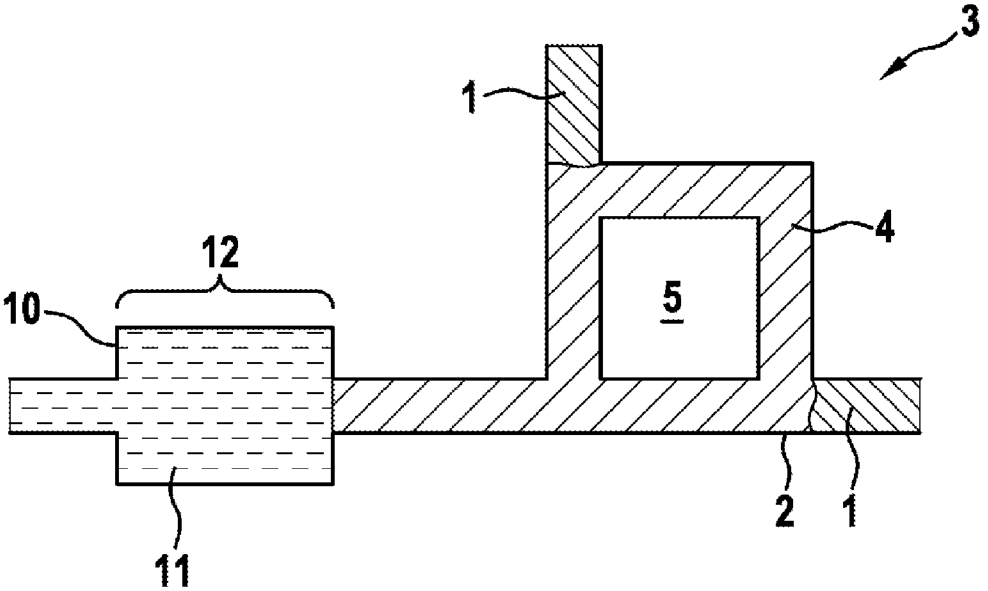
Figure 6D:
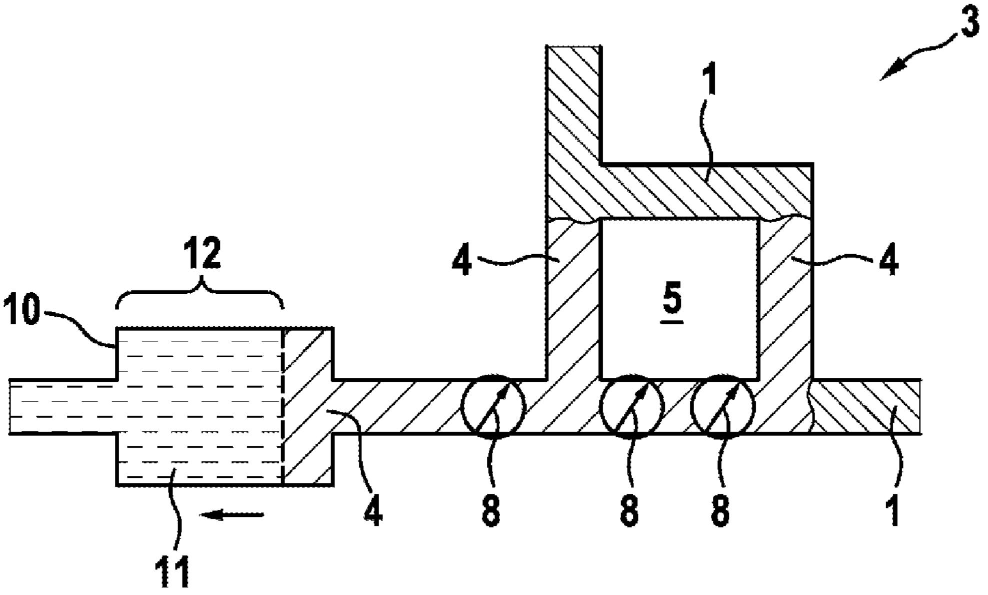
Figure 6E:
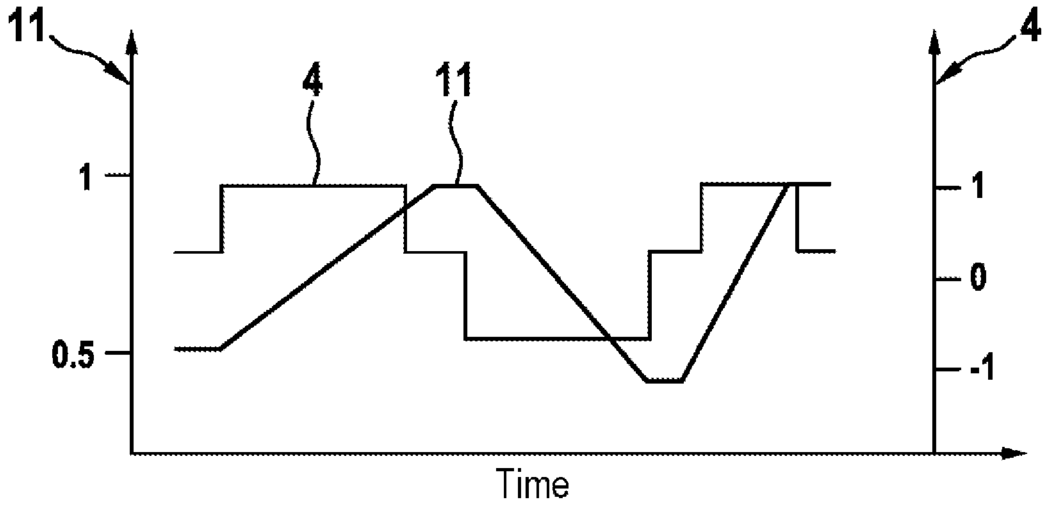

These filling states can thus for example be tracked by a chamber (preferably via fluorescence, but a bright field mode also being possible). The fill level or degree of filling 12 of this observation chamber 10 can consequently be co-coupled to the pump mechanism, and it can be decided in situ whether the pump has to be reversed and where the pumping phase or the second medium is presently situated in the circular structure or in the circular region 5 of the channel system 2. Associated exemplary temporal profiles of the filling states of second medium 4 and third medium 11 are indicated in FIG. 6*e*.

FIG. 7 schematically shows a further exemplary mode of operation of a microfluidic device 3 proposed here. The reference signs are used consistently, and so reference may be made in full to the statements concerning the preceding figures.

Figure 7A:
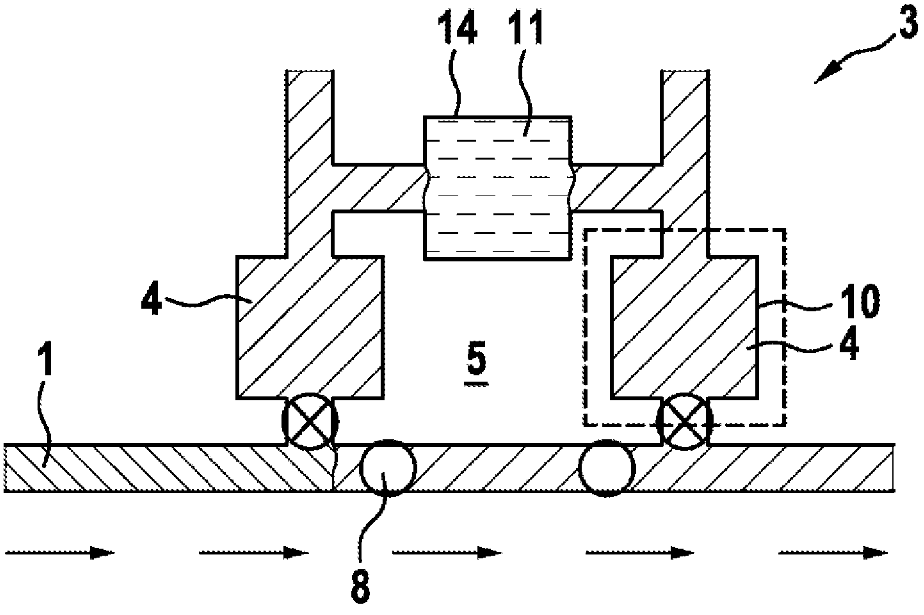
FIG. 7 shows a further exemplary mode of operation of a microfluidic device proposed here.
Figure 7B:
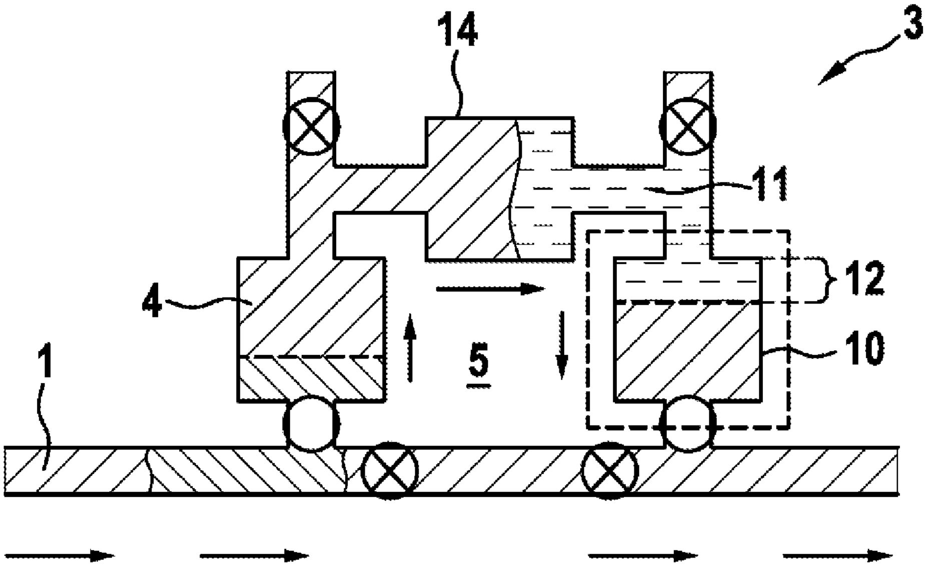
Figure 7C:
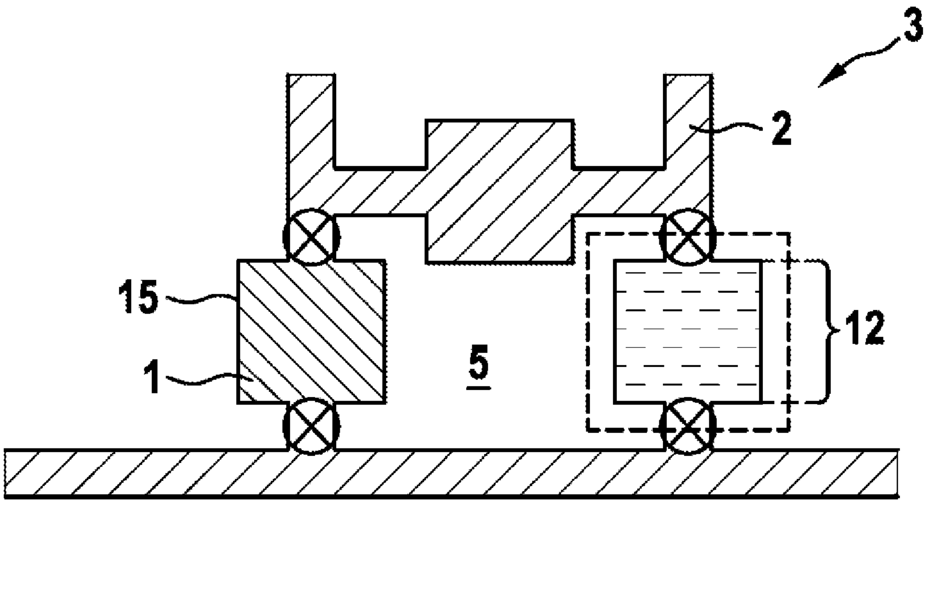

FIG. 7 shows an embodiment variant in which the principle of FIG. 6 is used to control the filling of a chamber 15 with sample or first medium 1. The chamber 15 is indicated in FIG. 7*c* and is illustrated in FIGS. 7*a* and 7*b* in each case. FIG. 7*a*, the chamber 15 is filled with the second medium 4. In FIG. 7*b*, the chamber 15 is already partly filled with the first medium and also partly filled with the second medium 4. In figure c, the chamber 15 is completely filled with the first medium 1. Here, the chamber 15, which may also be referred to as sample chamber 15 or analysis chamber 15, is not accessible optically. This setup can arise for example if, for example, a PCR chamber which is concealed from above and below by heating elements and does not permit any recording thereof has to be filled.

In this case, the sample chamber 15 or analysis chamber is connected here by way of example to two further chambers, specifically a storage chamber 14 and an (optically accessible) observation chamber 10. The storage chamber 14 is, in a basic position or starting situation (cf. FIG. 7*a*), filled completely with dye or third medium 11. The observation chamber 10 permits optical viewing. The sample material or first medium 1 can be guided to the analysis chamber 15 (see FIG. 7*b*). Preferably, the first medium 1 is guided to the analysis chamber 15 by way of an embodiment variant according to FIG. 5. The sample or the second medium 1 is then pumped via the two adjacent chambers 10, 14 into the sample or analysis chamber 15 (see FIG. 7*b*, with closed valves 8 in the bottom channel). In the process, the dye or the third medium 11 moves from the pre-storage unit or the storage chamber 14 into the optically accessible chamber 10. As a result of the volume conservation, it is then possible to deduce the filling of the sample chamber 15 by way of the filling of the chamber 10 or of the degree of filling 12 of third medium 11 in the chamber 10.

Figure 8:
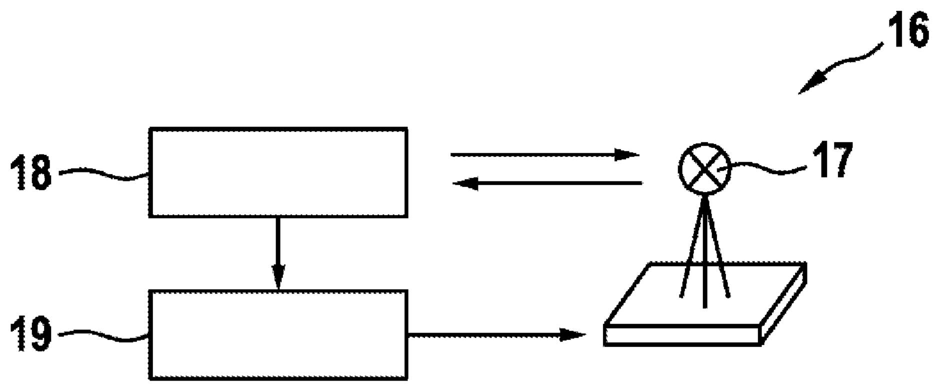
FIG. 8 shows an exemplary implementation of a method proposed here in an optofluidic system.

FIG. 8 schematically shows an exemplary implementation of a method proposed here in an optofluidic system 16. FIG. 8 shows in this respect an exemplary implementation of the aforementioned processes in an optofluidic system 16. Here, a camera 17 communicates with (pump) control software 18 which analyzes images and sends to the pneumatic unit 19 of the optofluidic system 16 commands concerning whether further pumping steps are necessary or not.

Figure 9:
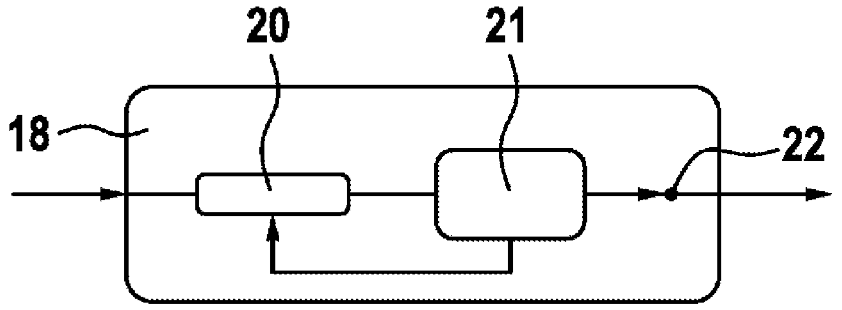
FIG. 9 shows a detail view of the system in FIG. 8.

FIG. 9 schematically shows a detail view of the system in FIG. 8. In this context, FIG. 9 illustrates by way of example an integration of the (pump) control software 18 into a fluidic sequence. Here, in block 20, one pumping cycle is realized in each case. Subsequently, in block 21, an image is recorded, the status of the pumping process is evaluated and a decision is made as to whether and with which valves and in which direction further pumping is necessary, or the (pump) control software 18 and point 22 can be ended and the sequence is moved on.

The solution proposed here permits in particular one or more of the following advantages:

- Cells and functionalized beads can be precisely used and moved on a peristaltic-pumping system without giving rise to interference for pumps or analytes.
- Rare cell material such as stem cells, circulating tumor cells, subtypes of immune cells (for example antigen-specific T-cells) can be processed on a chip without any problems. Since said cells often occur in extremely small quantities, each lost cell is a relatively great loss for the actual analysis. Also, the mechanical stress, which can alter these cell types, is positively reduced.
- The use of a two-phase system allows the actual sample volume to be reduced further, since the pump region, which would otherwise be a diluting dead volume, is, with the disclosure, substituted by an inert volume. Also, the volume can be adapted dynamically and in a manner corresponding to the sample. The microfluidic volume is thus controlled not only by the geometry.
- Possible purifications or enrichments can be made possible on-chip by means of functionalized beads. Additionally, the installation of a filter in the microfluidic network can advantageously be dispensed with. Beside the complex integration of filters (often material-dependent for different purifications), it is also possible for the washing volume used to be reduced.
- The disclosed process provides the basis for the implementation of on-chip sorting of a small volume. The processing of individual cells by means of peristaltic pumps makes possible the sorting and enrichment of different cells. Thus, from a restricted sample with little material, it is possible for the desired cell subtypes to be extracted in a targeted manner and, if desired, pooled (brought together). Standard methods such as flow cytometry often require for this purpose more volume and sample material than, for example, a biopsy sample provides.
- Circular pumping permits the repetition of sorting processes by means of peristaltic pumping. If this pumping does not damage cells, it is particularly suitable for rare cell material in small quantities.

The concept is particularly suitable for integration into an optofluidic system. By means of in-situ analysis of camera images, pumping operations can be controlled and manipulated so that the desired pump result is achieved.

It is not absolutely necessary for new valves used explicitly for pumping to be integrated into an existing microfluidic system in which fluidic sequences are controlled by valves. The pumping can be made possible by the dynamically controlled use of existing valves via software control.

The pumps can be controlled via geometry of the flow network and a camera. This makes possible the use of a feedback system. Consequently, pumping cycles do not have to be preprogrammed and can be adapted experimentally. This is particularly advantageous if the viscosity varies from sample to sample.

The optofluidic control system can also be implemented if the entire system cannot be observed from a chamber. Skillful linking of channel system and dyes allows the pumping speed and fillings of chambers to be controlled without the latter having to be viewed directly.

The invention claimed is:

1. A method for conveying at least one first medium within a channel system of a microfluidic device, comprising:

providing the at least one first medium at a first location of a channel of the channel system, the first location spaced apart from at least one fluid inlet of the channel;

conveying the at least one first medium from the first location to a second location of the channel of the channel system by configuring at least one valve for peristaltic pumping of only at least one second medium, the second location different from the first location and the at least one fluid inlet, the at least one second medium adjacent to the at least one first medium, the peristaltic pumping of the at least one second medium configured to cause movement of the at least one first medium in the channel from the first location to the second location;

configuring the at least one valve for the peristaltic pumping only when the at least one second medium flows through the at least one valve and not when the at least one first medium flows through the at least one valve, and configuring the at least one valve in an open position when the at least one first medium flows through the at least one valve, and serially opening and closing the at least one valve to configure the at least one valve for peristaltic pumping of the at least one second medium.

2. The method as claimed in claim 1, wherein:

the channel system further defines a loop channel located between the first location and the second location, the peristaltic pumping of the at least one second medium causes (i) the at least one first medium to be sucked into the loop channel, and (ii) the at least one second medium to flow away from the first location towards the second location, and the loop channel enables the at least one first medium located in the loop channel to repeatedly pass through a defined location of the loop channel, relative to the first location, as moved by the peristaltic pumping of the at least one second medium by the at least one valve.

3. The method as claimed in claim 1, wherein:

the at least one second medium circulates in a loop channel of the channel system, and the loop channel is located between the first location and the second location.

4. The method as claimed in claim 3, wherein at least some of the loop channel is not flowed through by the at least one first medium.

5. The method as claimed in claim 4, wherein:

the at least one valve peristaltically pumps the at least one second medium in a downstream direction away from the at least one inlet, the first location is located upstream of the loop channel, and the second location is located downstream of the loop channel.

6. The method as claimed in claim 1, wherein:

the at least one first medium is discharged from a loop channel of the channel system, the at least one second medium flows to the second location of the channel, and the loop channel is located between the first location and the second location.

7. The method as claimed in claim 1, further comprising:

optically monitoring the movement of the at least one first medium using an optical system operably connected to the channel system.

8. A method for conveying at least one first medium within a channel system of a microfluidic device, wherein comprising:

providing the at least one first medium at a first location of a channel of the channel system, the first location spaced apart from at least one fluid inlet of the channel;

conveying the at least one first medium from the first location to a second location of the channel by peristaltic pumping at least one second medium using at least one valve, the second location different from the first location and the at least one fluid inlet, the at least one second medium adjacent to the at least one first medium, the peristaltic pumping of the at least one second medium configured to cause movement of the at least one first medium in the channel from the first location to the second location; and configuring the at least one valve for the peristaltic pumping only when the at least one second medium flows through the at least one valve and not when the at least one first medium flows through the at least one valve, wherein the movement of the at least one first medium is monitored based on a degree of filling of a chamber by at least one third medium, wherein the peristaltic pumping of the at least one second medium is configured to cause movement of the at least one third medium, and wherein the chamber is fluidly connected to the channel.

9. A method for conveying at least one first medium within a channel system of a microfluidic device, comprising:

providing the at least one first medium at a first location of a channel of the channel system, the first location spaced apart from at least one fluid inlet of the channel;

conveying the at least one first medium from the first location to a second location of the channel by peristaltic pumping at least one second medium using at least one valve, the second location different from the first location and the at least one fluid inlet, the at least one second medium adjacent to the at least one first medium, the peristaltic pumping of the at least one second medium configured to cause movement of the at least one first medium in the channel from the first location to the second location;

configuring the at least one valve for the peristaltic pumping only when the at least one second medium flows through the at least one valve and not when the at least one first medium flows through the at least one valve; and monitoring the movement of the at least one first medium using at least one third medium, wherein the at least one third medium is adjacent to the at least one second medium.

10. The method as claimed in claim 8, wherein:

the channel system further defines a loop channel located between the first location and the second location, the peristaltic pumping of the at least one second medium causes (i) the at least one first medium to be sucked into the loop channel, and (ii) the at least one second medium to flow away from the first location towards the second location, and the loop channel enables the at least one first medium located in the loop channel to repeatedly pass through a defined location of the loop channel, relative to the first location, as moved by the peristaltic pumping of the at least one second medium by the at least one valve.

11. The method as claimed in claim 8, wherein:

the at least one second medium circulates in a loop channel of the channel system, and the loop channel is located between the first location and the second location.

12. The method as claimed in claim 11, wherein the at least one first medium enters the loop channel and then exits the loop channel without flowing through an entirety of the loop channel.

13. The method as claimed in claim 12, wherein:

the at least one valve peristaltically pumps the at least one second medium in a downstream direction away from the at least one inlet, the first location is located upstream of the loop channel, and the second location is located downstream of the loop channel.

14. The method as claimed in claim 8, wherein:

the at least one first medium is discharged from a loop channel of the channel system, the at least one second medium flows to the second location of the channel, and the loop channel is located between the first location and the second location.

15. The method as claimed in claim 8, further comprising:

optically monitoring the movement of the at least one first medium using an optical system operably connected to the channel system.

16. The method as claimed in claim 9, wherein:

the channel system further defines a loop channel located between the first location and the second location, the peristaltic pumping of the at least one second medium causes (i) the at least one first medium to be sucked into the loop channel, and (ii) the at least one second medium to flow away from the first location towards the second location, and the loop channel enables the at least one first medium located in the loop channel to repeatedly pass through a defined location of the loop channel, relative to the first location, as moved by the peristaltic pumping of the at least one second medium by the at least one valve.

17. The method as claimed in claim 9, wherein:

the at least one second medium circulates in a loop channel of the channel system, and the loop channel is located between the first location and the second location.

18. The method as claimed in claim 17, wherein the at least one first medium enters the loop channel and then exits the loops channel without flowing through an entirety of the loop channel.

19. The method as claimed in claim 18, wherein:

the at least one valve peristaltically pumps the at least one second medium in a downstream direction away from the at least one inlet, the first location is located upstream of the loop channel, and the second location is located downstream of the loop channel.

20. The method as claimed in claim 9, wherein:

the at least one first medium is discharged from a loop channel of the channel system, the at least one second medium flows to the second location of the channel, and the loop channel is located between the first location and the second location.

* * * * *